United States Patent Office 2,693,650
Patented Nov. 9, 1954

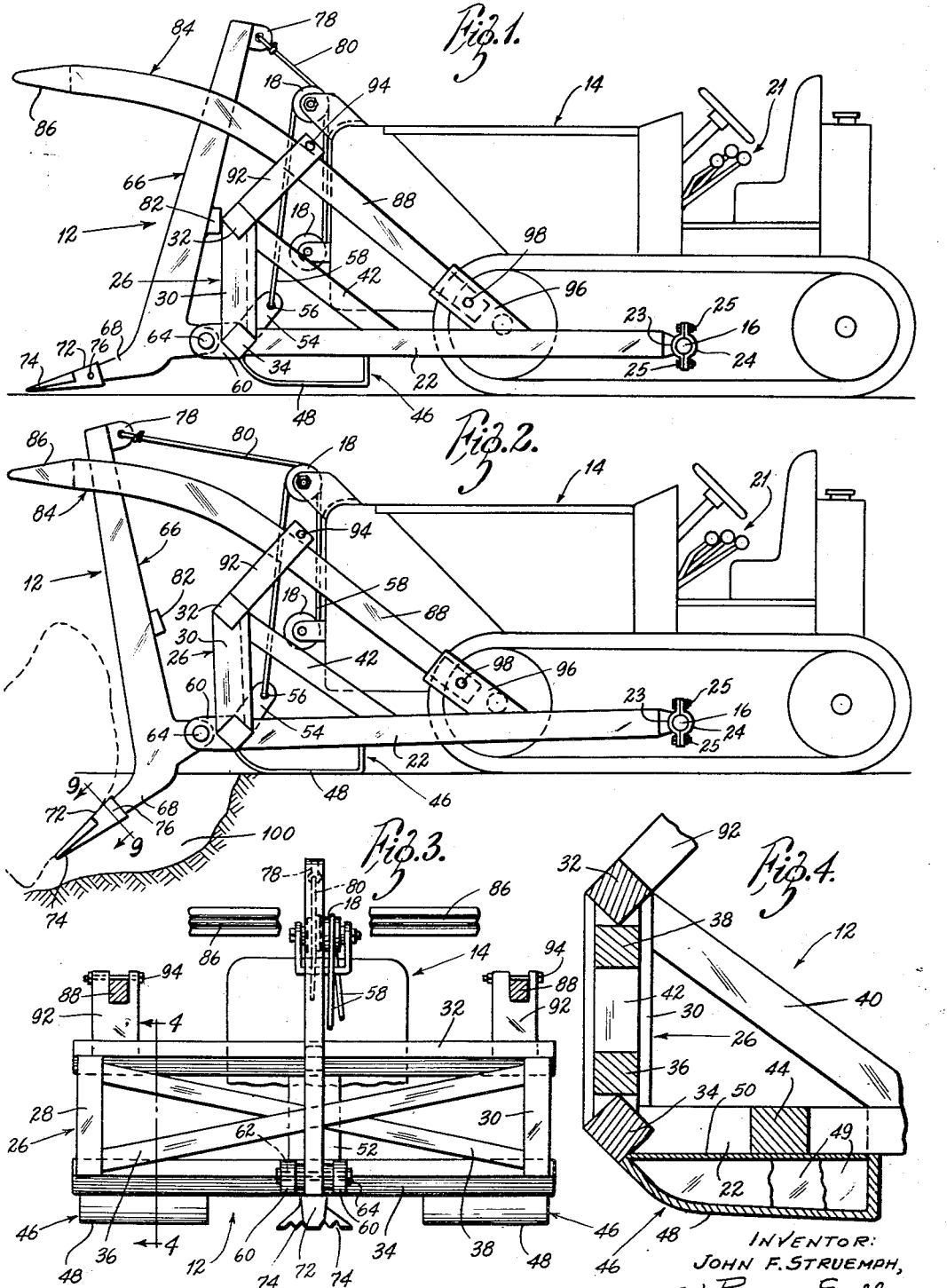

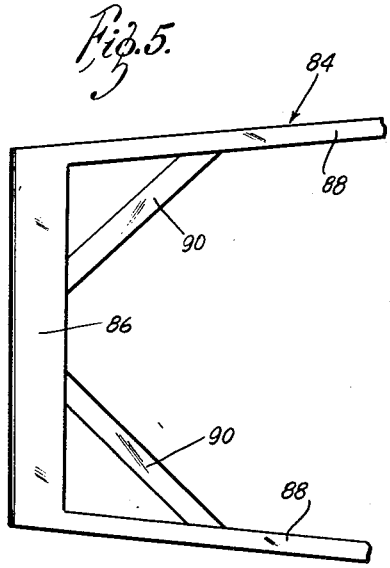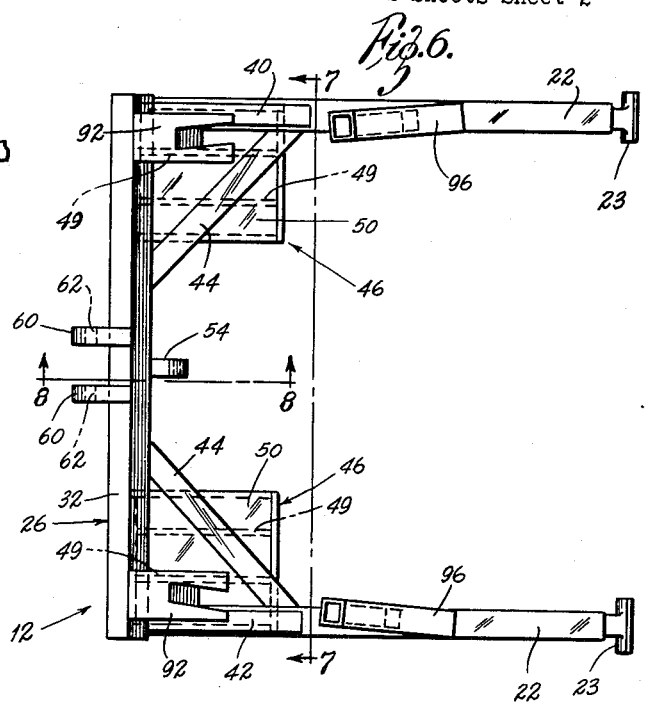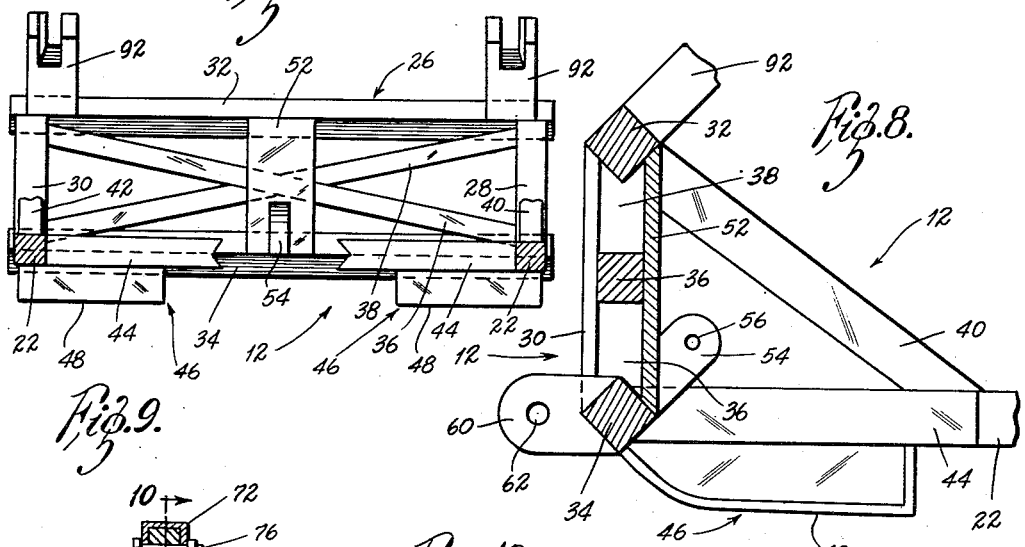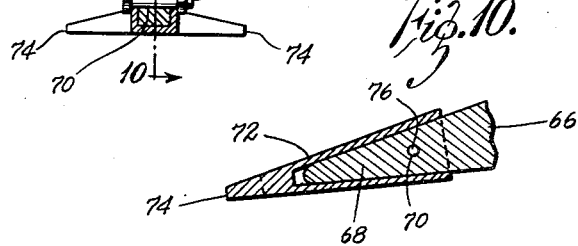

2,693,650

TREE REMOVER ATTACHMENT

John F. Struemph, Vienna, Mo.

Application May 4, 1950, Serial No. 159,945

5 Claims. (Cl. 37—2)

The present invention relates generally to the ground clearing art, and more particularly to a novel tree removing attachment for tractors and the like.

In its preferred form the attachment comprises a U-shaped member having means adjacent the ends of its leg portions for pivotally and removably fastening it to a tractor or the like. An upwardly extending lever member, having the lower end thereof pivotally mounted on the transverse portion of the U-shaped member, contains a forwardly extending prong-like portion adjacent the lower end thereof for engagement with the bottom of a tree or stump. Float members are fastened to the U-shaped member and are adapted to bear on the ground so that the weight of a tree or tree stump being elevated will be transmitted directly to the ground. Means are provided for raising and lowering the attachment and for actuating the lever member.

The tree and stump removing devices and attachments for tractors which are in use at the present time are not completely satisfactory. Most of them repeatedly break down or tip over when an attempt is made to use them to remove large trees or stumps.

One particular disadvantage with most, if not all, of these constructions is that the entire weight of the trees or stump being removed is transmitted directly to the front end of the tractor so as to cause the front end to be buried in the ground or the tractor to tip forwardly.

Another disadvantage with the attachments in use at the present time is that attaching or removing them from their prime mover is a very tedious and time-consuming job and quite often requires many hours to complete the operation.

It is an object of the present invention, therefore, to provide a novel tree removing attachment for tractors and the like, which can be easily and quickly attached to, or removed from, a prime mover.

Another object is to provide a tree removing attachment in which substantially the entire weight of the tree or stump being elevated is transmitted to floats bearing on the ground.

Another object is to provide a tree removing attachment which includes a removable boom for felling trees and for limiting the forward movement of the lever member.

Another object is to provide a tree removing attachment which contains a removable shoe on the prong-like end of the lever member for engagement with the tree being removed.

Further objects and advantages of the present invention will be apparent from the following description, reference being had to the accompanying drawings wherein a preferred embodiment of the present invention is shown, in which:

Fig. 1 is a side elevational view of a tree removing attachment made in accordance with the teachings of the present invention, shown with a caterpillar type tractor; the attachment being in the elevated or travelling position;

Fig. 2 is a view similar to Fig. 1 but with the attachment in the lowered or work position;

Fig. 3 is a fragmentary, front, elevational view of the attachment shown partially in section, some of the members being broken off to better illustrate the construction;

Fig. 4 is an enlarged fragmentary vertical sectional view taken on the line 4—4 of Fig. 3;

Fig. 5 is a top plan view of the forward end of the boom;

Fig. 6 is a top plan view of the tree removing attachment with the boom and lever member removed;

Fig. 7 is a vertical transverse sectional view taken on the line 7—7 of Fig. 6;

Fig. 8 is an enlarged, fragmentary, vertical, sectional view taken on the line 8—8 of Fig. 6;

Fig. 9 is an enlarged, transverse, sectional view taken on the line 9—9 of Fig. 2; and Fig. 10 is a fragmentary, vertical, sectional view taken on the line 10—10 of Fig. 9.

Referring to the drawings more particularly by reference numerals, 12 indicates generally a tree removing attachment embodying the teachings of the present invention shown mounted on a caterpillar type tractor 14. Manifestly, the attachment 12 could also be used with other types of prime movers having the desired power, weight and mobility.

As shown in Figs. 1 and 2, the tractor 14 contains a pair of trunnions 16 which project laterally from the sides thereof approximately midway between the front and rear wheels. A pair of cable winding drums 18 are located adjacent the front end of the tractor 14 and are controlled by a set of levers 21 in the operator's compartment.

The attachment 12 includes a pair of side bars 22, the rear ends of which are removably and pivotally mounted on the trunnions 16 as will appear. Brackets 23 containing a semicircular shaped groove of a size to receive the trunnions 16 are rigidly fastened to the free ends of the side bars 22 and are in engagement with the trunnions 16. Complementary brackets 24 are disposed on the other sides of the trunnions 16 and are removably fastened to the brackets 23 by bolts 25.

Fastened across the front ends of the side bars 22 is a cross frame or yoke 26 (Figs. 3 and 7) which contains vertical side members 28 and 30, a horizontal top member 32, a horizontal bottom member 34, and diagonal members 36 and 38. Member 36 is a one-piece brace while member 38 is in two pieces, as appears in Fig. 3, and is welded to both sides of the member 36.

The cross frame 26 is braced by members 40 and 42 (Figs. 1 and 4) which extend diagonally upwardly from the tops of the side bars 22 to the tops of the vertical side members 28 and 30, respectively. Diagonal bracing members 44 (Fig. 6) extend from the inside of the side bars 22 to the horizontal bottom member 34.

Fastened to the bottom of the attachment 12 adjacent the front outer corners thereof are a pair of rectangular shaped floats 46 which support the attachment 12 when it rests on the ground. As shown in Fig. 4, the bottom surface 48 of each float 46 is flat for the greater part of its length but the front end curves upwardly to meet the horizontal bottom member 34 in somewhat the same manner as a sled runner.

Each float 46 contains a series of spaced longitudinally extending ribs 49, and the floats are covered with panels 50 to prevent dirt and stones from lodging in them between the ribs.

Fastened to the rear surface of the cross frame 26 at the center thereof is a member 52 (Fig. 7) which extends vertically between the top and bottom horizontal members 32 and 34 respectively.

A bracket 54 (Figs. 7 and 8) with an opening 56 therein is fastened adjacent the bottom of the member 52 and a cable 58 (Fig. 1) is connected between it and one of the winding drums 18 for raising and lowering the attachment.

Mounted on the front of the horizontal bottom member 34 of the cross frame 26 adjacent the center thereof are a pair of spaced brackets 60 (Figs. 6 and 8) containing aligned openings 62.

A rod 64 extends through the aligned openings 62 and the lower end of a lever member 66 (Figs. 1 and 2) is pivotally mounted thereon between the brackets 60.

Formed integral with the bottom of the lever member 66 and extending downwardly and forwardly therefrom is a prong element 68 which contains a transverse opening 70 adjacent its free end (Fig. 10).

A removable shoe 72 containing a series of forwardly extending projections 74 at the end thereof (Fig. 3) is fastened on the end of the prong element 68 by a bolt 76 (Fig. 9) which passes through the opening 70.

Fastened to the upper end of the lever member 66 is a bracket 78 (Figs. 1 and 2) which receives the end of a cable 80 connected to one of the winding drums 18 for actuating the lever member. If desirable, a block can be fastened to the bracket 78 and the cable 80 played through the block to increase the mechanical advantage. Although cable winding drums are shown and described, it is to be understood that hydraulic means could also be used for raising and lowering the attachment 12 and for actuating the lever member 66 without departing from the spirit of the invention.

A resilient bumper 82 is fastened to the rear edge of the lever member 66 approximately midway between its ends so as to limit the rearward movement of the lever member 66 by the bumper contacting the horizontal top member 32.

Protruding in front of the lever member 66 is a U-shaped boom 84 (Figs. 1 and 5) which limits the forward movement of the lever member 66 and which is removably fastened to the cross frame 26 and side bars 22 as will appear.

The boom 84 comprises a transverse member 86 and slightly arcuate leg members 88 which are fastened at each end thereof (Fig. 5). Cross braces 90 extend between the transverse member 86 and the upper ends of the leg members 88.

Mounted on the top of the cross frame 26 at each end is a bifurcated bracket 92 (Figs. 1, 3 and 7) which extends upwardly and rearwardly and which contains a vertically extending slot of a size to receive a leg member 88 of the boom 84.

Removable bolts 94 extend transversely through the upper ends of the bifurcated portions of the brackets 92 above the leg members 88 so as to maintain the latter in position.

Extending upwardly and forwardly from each of the side bars 22 approximately midway between their ends are sockets 96 (Figs. 1, 2 and 6) which receive the ends of the leg members 88.

Bolts 98 pass transversely through the walls of the sockets 96 and the ends of the leg members 88 so as to removably maintain the latter in position.

*Operation*

The device can be used to knock down trees and disengage their rooted ends from the soil or it can be used for removing tree stumps.

When used to fell and uproot trees the control levers 21 are actuated so that the cable 58 is wound up to cause the attachment 12 to be raised to the position shown in Fig. 1.

The tractor 14 is then moved into a position in which the transverse member 86 of the boom 84 is against the tree which is to be removed. For best results the tree should be centered with respect to the transverse member 86, although this is not absolutely necessary.

The tractor 14 is then moved toward the tree so as to cause the boom 84 to push it over. The force of the tree acting against the end of the boom 84 is transmitted rearwardly through the leg members 88, to the sockets 96, and thence through the side bars 22 to the trunnions 16.

When the tree is felled, a cavity 100 is usually created in the earth adjacent the root end of the tree, as shown in Fig. 2.

The levers 21 are actuated to release the cable 80 and permit the lever member 66 to fall forwardly and drop the prong element 68 into the edge of the cavity 100 adjacent the root end of the tree.

The cable 58 is then released so as to permit the attachment to drop downwardly and the floats 46 to rest on the ground. The tractor 14 is moved toward the root end of the tree with the bottom surface 48 of the floats 46 sliding on the ground until the foot 72 is embedded under the root end of the tree, as shown in Fig. 2.

The control levers 21 are then actuated to wind up the cable 80. This causes the prong element 68 of the lever member 66 to move clockwise (Figs. 1 and 2) about the pivot 64 thereby lifting the root end of the tree and breaking off the roots which held it captive.

When the prong element 68 is moved clockwise against the tree as described above, the weight of the tree is transmitted through the lever member 66, the pin 64, the brackets 60 and the cross frame 26 to the floats 46 which bear on the ground. Thus, the force required to lift the root end of the tree is transmitted directly to the ground instead of through the front end of the tractor, thereby obviating the possibility of tipping the tractor 14 or driving the relatively narrow front ends of its treads into the ground.

If desired, at the same time that the prong element 68 is being elevated, the tractor 14 can be moved forwardly with the floats 46 sliding on the ground so as to lift the root end of the tree from the cavity 100 and move it bodily away from it.

After the tree has been removed, the levers 24 are actuated to cause the cable 80 to unwind, thereby permitting the lever member 66 to rotate in the counterclockwise direction so as to disengage the prong element 68 from the root end of the tree. The tractor 14 is then moved rearwardly and the levers 21 actuated to cause the cable 58 to wind up on one of the drums 18 so as to lift the attachment 12 to the travelling position shown in Fig. 2. The apparatus is then ready to move to another tree where the above mentioned process can be repeated.

To remove a tree stump which is embedded in the ground in a vertical position, the tractor 14 is moved adjacent the stump and the cable 80 released to permit the lever member 66 to fall forwardly and drop the prong element 68 adjacent the base of the stump. The cable 58 is then released and the tractor driven forward until the prong element 68 is driven firmly into or under the stump, and the floats 46 rest on the ground.

The control levers 21 are then actuated to wind up the cable 80. This causes the prong element 68 to break the stump free from the ground, and, as the stump is being lifted out of the ground, the tractor 14 is driven forward with the weight supported on the floats 46 so that the stump is simultaneously lifted and carried out of its cavity.

With the attachments in use at the present time, it is extremely difficult to move the end of a felled tree after it has been elevated because the front end of the tractor treads tend to dig into the ground. With the construction described herein, however, this does not present any problem whatsoever because the floats are large enough to easily support the weight of the tree without digging into the ground.

The present attachment 12 has the particular advantage that it can be removed from or fastened to the tractor trunnions 16 in a matter of minutes instead of requiring hours and a crew of men as is necessary with the equipment in use at the present time. Thus, by merely removing the bolts 25 and the brackets 24 from adjacent each trunnion 16, and disconnecting the cables 58 and 80, the entire attachment 12 can be removed as a unit. Or, if it is desirable to remove only the boom 84, this can be accomplished by merely removing the bolts 94 and 98 on each side and lifting the boom 84 bodily forwardly and upwardly.

The shoe 72 can be easily and quickly removed from the prong element 68 whenever the former becomes worn by merely removing the bolt 76. Also, if desirable, the shoe 72 can be replaced with other shoes of different shapes and sizes to suit the particular job.

Thus, it is apparent that there has been provided a novel tree removing attachment which fulfills all of the objects and advantages sought therefor.

It is to be understood that the foregoing description and the accompanying drawings have been given only by way of illustration and example and that changes and alterations in the present disclosure which will be readily apparent to one skilled in the art are contemplated as within the scope of the present invention, which is limited only by the claims which follow.

What is claimed is:

1. An attachment for tractors and the like, comprising a U-shaped attachment element having a transverse member and leg members fastened adjacent the ends thereof; means adjacent the free ends of the leg members for pivotally attaching the element to a tractor or the like; an upwardly extending lever member having the lower end thereof pivotally mounted on the transverse member; means including a top member extending above said transverse member limiting the rearward movement of the lever member; and means limiting the forward movement of the lever member, said last-named means including a boom-like member fastened on top of the attachment element and being supported by said top member, the boom-like member containing a transverse portion extending in front of the lever member.

2. An attachment for tractors and the like, comprising a U-shaped attachment element having a transverse member and leg members fastened adjacent the ends thereof; means adjacent the free ends of the leg members for pivotally attaching the element to a tractor or the like; an upwardly extending lever member having the lower end thereof pivotally mounted on the transverse member; a U-shaped boom-like member disposed above the attachment element and extending upwardly at an angle therefrom, said boom-like member containing a transverse portion extending in front of the lever member for limiting the forward movement of said lever member, and leg portions fastened adjacent the ends of the transverse portion; and socket-like means on the leg members of the attachment element to receive the free ends of said leg portions.

3. An attachment for tractors and the like, comprising a U-shaped attachment element having a transverse member and leg members fastened adjacent the ends thereof; means adjacent the free ends of the leg members for pivotally attaching the element to a tractor or the like; an upwardly extending lever member having the lower end thereof pivotally mounted on the transverse member; a U-shaped boom-like member disposed above the attachment element and extending upwardly and forwardly at an angle therefrom, said boom-like member containing a transverse portion extending in front of the lever member, and leg portions fastened adjacent the ends of the transverse portion; bifurcated members extending upwardly from the transverse member of the attachment element adjacent each end thereof to removably receive the leg portions of the boom-like member; and socket like means on the leg members to removably receive the free ends of said leg portions.

4. An attachment for tractors and the like, comprising a U-shaped attachment element having a transverse member and leg members fastened adjacent the ends thereof; means adjacent the free ends of the leg members for pivotally attaching the element to a tractor or the like; a top member extending upwardly from and generally parallel to the transverse member from one end thereof to the other to protect the front end of the tractor; an upwardly extending lever member having the lower end thereof pivotally mounted on the transverse member in front of the top member, the top member limiting the rearward movement of the lever member; and a U-shaped boom-like member disposed above the attachment element and extending upwardly at an angle therefrom over the top of the top member, the boom-like member containing a transverse portion extending in front of the lever member.

5. An attachment for tractors and the like, comprising a U-shaped attachment element having a transverse member and leg members fastened adjacent the ends thereof; means adjacent the free ends of the leg members for pivotally attaching the element to a tractor or the like; a top member extending upwardly from and generally parallel to the transverse member from one end thereof to the other to protect the front end of the tractor; an upwardly extending lever member having the lower end thereof pivotally mounted on the transverse member in front of the top member, the top member limiting the rearward movement of the lever member; a U-shaped boom-like member disposed above the attachment element and extending upwardly at an angle therefrom over the top of the top member, the boom-like member containing a transverse portion extending in front of the lever member; and leg portions extending rearwardly from the ends of the transverse portion; means on the top of the top member adjacent each end thereof for removably supporting the leg portions of the boom-like member and means on the leg members of the attachment element back of the top member for removably receiving the ends of the leg portions of the boom-like member.

References Cited in the file of this patent

UNITED STATES PATENTS

| Number | Name | Date |
| --- | --- | --- |
| 941,224 | Bethune | Nov. 23, 1909 |
| 2,103,775 | Frink | Dec. 28, 1937 |
| 2,139,625 | Pruss | Dec. 6, 1938 |
| 2,173,406 | Wilkinson | Sept. 19, 1939 |
| 2,184,045 | Jeffrey | Dec. 19, 1939 |
| 2,295,458 | Edwards | Sept. 8, 1942 |
| 2,322,115 | Cox et al. | June 15, 1943 |
| 2,436,510 | Ferguson | Feb. 24, 1948 |
| 2,460,348 | Henry | Feb. 1, 1949 |
| 2,482,320 | Clemmer | Sept. 20, 1949 |
| 2,506,662 | Cusenbary | May 9, 1950 |
| 2,584,485 | McNeil | Feb. 5, 1952 |